United States Patent Office 3,637,572
Patented Jan. 25, 1972

3,637,572
EPOXY RESINS WITH ORGANOBORON CURE PROMOTORS
Masatzugu Ogata, Mikio Sato, Yutaka Watanabe, and Hiroshi Suzuki, Hitachi, Japan, assignors to Hitachi, Ltd., and Hitachi Chemical Company, Ltd., both of Tokyo, Japan
Filed May 21, 1970, Ser. No. 39,224
Claims priority, application Japan, May 26, 1969, 44/40,189, 44/40,190
Int. Cl. C08g 51/04, 17/13, 33/10
U.S. Cl. 260—37 EP                    10 Claims

ABSTRACT OF THE DISCLOSURE

An epoxy resin composition improved in curability and pot life (storing stability) which is prepared by blending an epoxy resin with an acid anhydride curing agent and a curing promotor composed of an organoboron compound represented by the general formula,

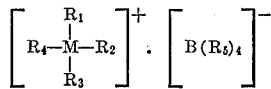

wherein M represents P or As; and $R_1$, $R_2$, $R_3$, $R_4$ and $R_5$, which may be same or different, represent individually an alkyl, alkenyl or aryl group.

---

At present, thermosetting resins are used for the production of almost all of electric insulating materials, injection molded articles, paints and adhesives. Among these, epoxy resins are widely used by virtue of their low volume shrinkage at the time of curing and their excellent characteristics in electrical properties and moisture and heat resistance. In order to be used for said purpose, epoxy resins require the use of such a curing agent as an acid anhydride or an amine compound. In electrical use, however, the former, i.e. acid anhydride, which gives a cured article more excellent in properties, is used more frequently than the latter, i.e. amine compound. An epoxy resin composition using an acid anhydride is long in pot life at room temperature but, at the time of curing, is required to be heated for a long period of time at a high temperature. Ordinarily, therefore, the curing time thereof is intended to be shortened by addition of a small amount of a curing promotor. In this case, however, there is brought about such a practical drawback that the composition is shortened also in pot life. Accordingly, there has strongly been desired the development of a curing promotor which can provide long pot life and quick curability. That is, it is extremely useful to use a latent curing promotor which is inert at normal temperature but displays excellent promoting action at an elevated temperature.

An object of the present invention is to provide an epoxy resin composition which is stable at normal temperature but quickly cures on heating.

Another object is to provide an epoxy resin composition capable of giving a cured product which is excellent in electrical, mechanical and thermal properties.

A further object is to provide an epoxy resin composition excellent in processability.

A still further object is to provide an epoxy resin composition which, when used as an insulating material for electric means, makes possible the continuous and mass production of said electric means.

Another object is to provide an epoxy resin composition which, when used for the production of epoxy resin molded articles, makes possible the continuous and mass production of said molded articles.

Other objects will be readily understood from the following explanation.

The gist of the present invention resides in an epoxy resin composition which comprises an epoxy resin, an acid anhydride curing agent and a curing promotor composed of an organoboron compound represented by the general formula,

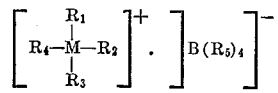

wherein M represents P or As; and $R_1$, $R_2$, $R_3$, $R_4$ and $R_5$, which may be same or different, represent individually an alkyl, alkenyl or aryl group.

Figure 1:
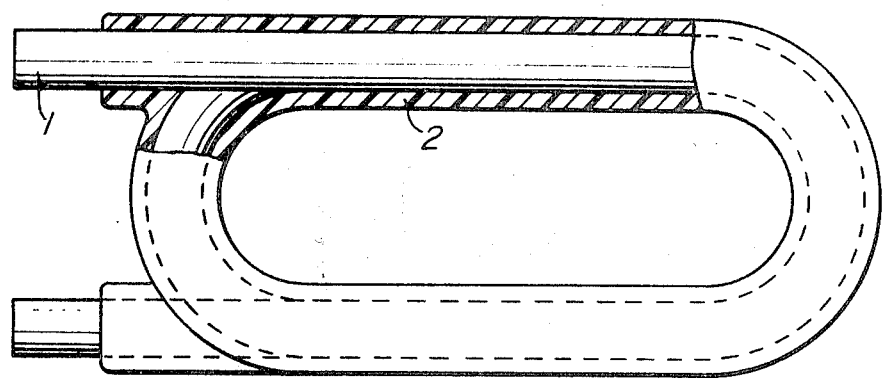
Figure 2:
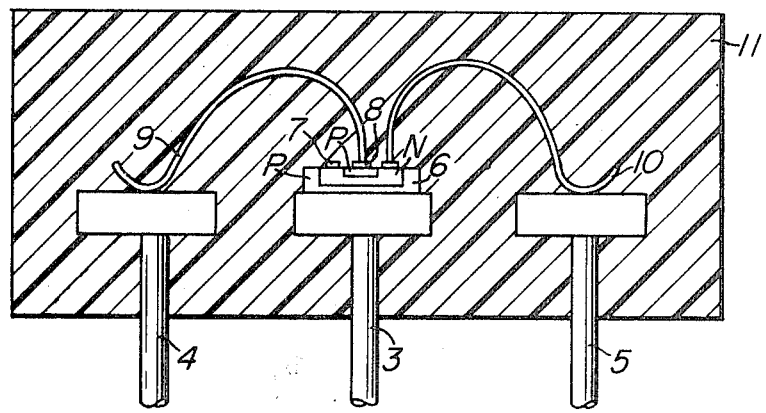

The accompanying drawings show application examples of the present epoxy resin composition, in which FIG. 1 is a cross-sectional lateral view of a part of a field coil of electric motor which has been resin-molded and FIG. 2 is a cross-sectional view of a semiconductor apparatus which has been resin-molded.

Curing promotors composed of the aforesaid organoboron compounds are effective for all the epoxy resins in the presence of an acid anhydride curing agent, and have an ability to improve the resins in curability and pot life. Accordingly, the properties of various epoxy resins can be effectively applied. That is, among many epoxy resins, those which have properties suitable for desired products can be selectively used without any restriction.

The epoxy resins referred to herein include, for example, polyglycidyl ethers and esters obtained by reacting such a polyhydric phenol as Bisphenol A, halogenated Bisphenol A, catechol or resorcinol, or such a polyhydric alcohol as glycerin, with epichlorohydrin in the presence of a basic catalyst; epoxy-novolak resins obtained by condensing a novolak type phenol resin with epichlorohydrin; epoxidized polyolefins; epoxidized polybutadienes; epoxidized vegetable oils; cyclopentadiene oxide type epoxy resins; and cyclohexene oxide type epoxy resins. Among these epoxy resins, those having 1,2-epoxy groups are particularly markedly improved in curability and pot life by addition of the aforesaid organoboron compounds. In the present invention, these epoxy resins may be used in admixture of 2 or more.

The organoboron compounds represented by the aforesaid general formula which are used in the present invention include, for example, tetrabutylphosphonium tetra-phenylborate, (n-butyl)triphenylphosphonium tetraphenylborate, tetraphenylphosphonium tetraphenylborate, trimethylphenylphosphonium tetraphenylborate, diethylmethylphenylphosphonium tetraphenylborate, diallylmethylphenylphosphonium tetraphenylborate, (2-hydroxyethyl)triphenylphosphonium tetraphenylborate, (ethyl)triphenylphosphonium tetraphenylborate, p-xylenebis(triphenylphosphonium tetraphenylborate), tetraphenylphosphonium tetraethylborate, tetraphenylphosphonium triethylphenylborate, tetraphenylphosphonium tetrabutylborate and tetraphenylarsonium tetraphenylborate. Particularly useful organoboron compounds are those of the aforesaid general formula, in which M represents P. The above-mentioned organoboron compounds are not only used alone but also in combination of 2 or more. The amount of the organoboron compound to be blended is not particularly limited, and the object of the present invention can sufficiently be accomplished when the compound is used in an amount substantially equal to that of a common curing promotor. Concretely, the organoboron compound is used in an amount within the range of 0.1 to 10 parts by weight per 100 parts by weight of the epoxy resin used.

The curing agent used in the present invention includes all the known acid anhydride curing agents such as, for example, maleic, dichloromaleic, dodecenylsuccinic, pyromellitic, trimellitic, phthalic, tetrahydrophthalic, hexahydrophthalic, endomethylenetetrahydrophthalic, methylendomethylenetetrahydrophthalic and hexachloroendomethylenetetrahydrophthalic anhydrides, methyltetrahydrophthalic anhydride and methylhexahydrophthalic anhydride. These acid anhydride curing agents may also be used in combination of 2 or more. The amount of the acid anhydride curing agent to be used is not particularly limited. Generally, however, it is desirable to use the curing agent in an amount within the range of 0.001 to 1.5 moles per mole epoxy equivalent of the epoxy resin.

The epoxy resin composition of the present invention may be blended with various filler powders without injuring the effects of the invention. The amount of the filler powder to be blended can be optionally selected. For example, in case the heat resistance, moisture resistance and mechanical and electrical properties of a cured product obtained from the epoxy resin composition are desired to be improved or the thermal expansion coefficient thereof is desired to be made extremely small, the amount of the filler powder is made more than 15% by volume, particularly more than 50% by volume, whereby the object can be accomplished. If the amount of the inorganic filler powder is made larger, there is such a tendency that the epoxy resin composition is gradually deprived of its fluidity and thus is greatly injured in processability, so that it is desirable to take the above point into consideration. The present inventors have solved the above-mentioned problem by using 5 to 60% by volume based on the amount of the composition of a filler powder having a fine granularity of less than 44μ, and 10 to 70% by volume based on the amount of the composition of a filler powder having a coarse granularity of more than 74μ. If the amount of the filler powder having a fine granularity of less than 44μ becomes smaller than 5% by volume, an epoxy resin composition containing a normally liquid epoxy resin becomes considerably low in viscosity, while an epoxy resin composition containing a normally solid epoxy resin becomes low in viscosity at the time of heating and melting, and thus favorable processability can be attained. In this case, however, it is scarcely possible to improve the heat resistance, moisture resistance and electrical and mechanical properties of the composition or to decrease the thermal expansion coefficient thereof. If the amount of the filler powder having a granularity of less than 44μ becomes more than 60% by volume, the epoxy resin composition is greatly deteriorated in processability (viscosity), and the resulting composition is not suitable for practical use. On the other hand, if the amount of the filler powder having a coarse granularity of more than 74μ is less than 10% by volume, the powder settles at the time of curing of the epoxy resin composition to cause such a fear that no cured product having uniform composition and quality can be obtained. Further, if the amount of said filler powder becomes more than 70% by volume, the epoxy resin composition tends to be deteriorated in fluidity.

The filler powder employed in the present invention includes, for example, powders of alumina, silica, magnesia, zirconia, calcium oxide, zirconium silicate, calcium silicate, beryllium aluminum silicate, lithium aluminum silicate, magnesium silicate, aluminum silicate, ilmenite, barium sulfate, calcium sulfate, calcium carbonate, barium carbonate, lead oxide (PbO), lead dioxide ($PbO_2$), red lead ($Pb_3O_4$) and lead sesquioxide ($Pb_2O_3$). At least one of these filler powders is used in the present invention.

The epoxy resin compositions of the present invention may be incorporated with any of diluents, flexibilizers, modifiers, pigments and parting agents, in addition to the aforesaid filler powders.

The epoxy resin compositions provided in accordance with the present invention can be utilized over an extremely wide scope, including electric insulating materials, injection-molded articles, compression-molded articles, laminates, adhesives, impregnating agents, etc. For use as electric insulating materials, for example, the present epoxy resin compositions can be applied to such electric apparatus as shown in the accompanying drawings FIGS. 1 and 2.

FIG. 1 is a cross-sectional lateral view of a resin-molded field coil, in which 1 is a field coil (conductor) and 2 is a mold resin, and the gap of said field coil has also been impregnated with the epoxy resin composition. When the epoxy resin composition of the present invention is used for the insulation of such coil as mentioned above, the continuous and mass production of the coil can be effected since the resin is excellent in storage stability.

FIG. 2 is a cross-sectional view showing the inner structure of a semiconductor apparatus, in which 3 is a collector electrode, 4 is an emitter electrode, 5 is a base electrode, 6 is a semiconductor pellet, 7 and 8 are aluminum films, 9 and 10 are gold wire and 11 is a mold resin. As shown in FIG. 2, it is also possible to use the epoxy resin composition of the present invention as the mold resin 11. In this case, if there is used an epoxy resin composition which has been minimized in thermal expansion coefficient of cured product by incorporation of a large amount of filler powder, disconnection troubles due to thermal stress generated by heat cycle or destruction of elements can be substantially prevented.

In addition thereto, the epoxy resin compositions of the present invention can be used as mold resins and insulating materials for such electrical apparatus as I.C. parts, micro-module and the like electronic circuit parts, motors for general purposes, coils for transformers, and general electic heating apparatus. Further, they are usable as impregnating varnishes for resin laminates such as resin laminate plates and tubes, adhesives for constitutive parts of electrical apparatus, insulating paints for insulated wires, and general paints.

The present invention is illustrated in further detail below with reference to examples and reference examples.

EXAMPLE 1

A mixture comprising 100 parts by weight of Epikote 828 (trade name for an epoxy resin produced by Shell Chemical Co.) and 89 parts by weight of a methylendomethylene-tetrahydrophthalic anhydride curing agent (hereinafter abbreviated to "MHAC-P") was blended with 3 parts by weight of a curing promoter composed of each of the organoboron compounds shown in Table 1 to obtain desired epoxy resin compositions (Sample Nos. 1 to 7).

REFERENCE EXAMPLE 1

A mixture comprising 100 parts by weight of Epikote 828 and 89 parts by weight of MHAC-P was blended with 1 part by weight of each of the known curing promotors shown in Table 1 to prepare epoxy resin compositions (Sample Nos. 8 and 9).

The gelation time, pot life and pot life-gelation time ratio of each epoxy resin composition of Example 1 and Reference Example 1 are set forth in Table 1.

TABLE 1

| Sample No. | Kind of curing promotor | Gelation time (hr.) at— | | Pot life [1] (hr.) | Pot life/gelation time | |
|---|---|---|---|---|---|---|
| | | 150° C. | 120° C. | | G 150° C.[2] | G 120° C.[3] |
| 1 | Tetraphenylphosphonium tetraphenylborate | 0.10 | 0.35 | 600 | 6,000 | 1720 |
| 2 | (n-Butyl)triphenylphosphonium tetraphenylborate | 0.15 | 0.75 | 215 | 1,433 | 287 |
| 3 | (2-hydroxyethyl)triphenylphosphonium tetraphenylborate | 0.20 | 0.75 | 225 | 1,125 | 300 |
| 4 | (Ethyl)triphenylphosphonium tetraphenylborate | 0.15 | 0.80 | 245 | 1,633 | 306 |
| 5 | p-Xylenebis(triphenylphosphonium tetraphenylborate) | 0.33 | 1.83 | 770 | 2,330 | 421 |
| 6 | Tetra-n-butylphosphonium tetraphenylborate | 0.20 | 1.00 | 350 | 1,750 | 350 |
| 7 | Tetraphenylarsonium tetraphenylborate | 0.15 | 0.50 | 482 | 3,213 | 964 |
| 8 | 2,4,6-tris(dimethylaminomethyl)phenol | 0.09 | 0.22 | 29 | 322 | 132 |
| 9 | Benzyldimethylamine | 0.12 | 0.27 | 19 | 158 | 70 |

[1] The pot life is a time required for the epoxy resin composition to reach, when allowed to stand at 40° C., 10 times the viscosity at the time of preparation (i.e. initial viscosity).
[2] The ratio when the gelation was effected at 150° C.
[3] The ratio when the gelation was effected at 120° C.

NOTE—The same shall apply hereinafter.

From Table 1, it will be easily understood that all the organoboron compounds are effective as curing promotors for obtaining epoxy resin compositions which are quickly curable and long in pot life.

EXAMPLE 2

A mixture comprising 100 parts by weight of Epikote 828 and 78 parts by weight of a hexahydrophthalic anhydride curing agent was blended with 1.5 parts by weight of tetraphenylphosphonium tetraphenylborate (hereinafter abbreviated to "TPP-K") as a curing promotor to obtain a desired epoxy resin composition (Sample No. 10).

EXAMPLE 3

A mixture comprising 100 parts by weight of Epikote 828 and 130 parts by weight of a dodecenylsuccinic anhydride curing agent was blended with 1.5 parts by weight of TPP-K as a curing promotor to obtain a desired epoxy resin composition (Sample No. 11).

EXAMPLE 4

A mixture comprising 100 parts by weight of DER-332 (trade name for an epoxy resin produced by Dow Chemical Co.) and 100 parts by weight of a MHAC-P curing agent was blended with 1.5 parts by weight of TPP-K as a curing promotor to obtain a desired epoxy resin composition (Sample No. 12).

REFERENCE EXAMPLE 2

The same mixture as in Example 2 was blended with 1.0 part by weight of 2,4,6-tris(dimethylaminomethyl)phenol (hereinafter abbreviated to "DMP-30") as a curing promotor to prepare an epoxy resin composition (Sample No. 13).

REFERENCE EXAMPLE 3

The same mixture as in Example 3 was blended with 1.0 part by weight of DMP-30 as a curing promotor to prepare an epoxy resin composition (Sample No. 14).

REFERENCE EXAMPLE 4

The same mixture as in Example 4 was blended with 1.0 part by weight of DMP-30 as a curing promotor to prepare an epoxy resin composition (Sample No. 15).

The gelation time, pot life and pot life-gelation time ratio of each of the epoxy resin compositions obtained in Examples 2 to 4 (Sample Nos. 10 to 12) and Reference Examples 2 to 4 (Sample Nos. 13 to 15) are set forth in Table 2.

TABLE 2

| Sample No. | Gelation time (hr.) at— | | Pot life (hr.) | Pot life/gelation time | |
|---|---|---|---|---|---|
| | 150° C. | 120° C. | | G 150° C. | G 120° C. |
| 10 | 0.07 | 0.30 | 720 | 10,290 | 2,400 |
| 11 | 0.10 | 0.55 | 850 | 8,500 | 1,545 |
| 12 | 0.15 | 0.73 | 377 | 2,510 | 517 |
| 13 | 0.07 | 0.25 | 36 | 514 | 144 |
| 14 | 0.10 | 0.27 | 53 | 530 | 196 |
| 15 | 0.10 | 0.30 | 78 | 780 | 260 |

From the results shown in Table 2, it will be understood that in the present invention, the desired objects can be attained even when various acid anhydride curing agents are used.

The electrical properties of cured products of Sample No. 1 of Example 1, Sample No. 8 of Reference Example 1 and the epoxy resin compositions of Examples 2 to 4 (Sample Nos. 10 to 12) and Reference Examples 2 to 4 (Samples Nos. 13 to 15) are shown in Table 3, and the mechanical properties and heat distortion temperature thereof are shown in Table 4. The curing was effected by heating each composition in an air bath at 120° C. for 6 hours.

TABLE 3

| | Item | | | | | | | |
|---|---|---|---|---|---|---|---|---|
| | Volume resistivity ($\Omega$ cm.) | | Dielectric constant | | | Dielectric loss tangent (percent) | | |
| Measurement temperature (° C.) | 80 | 120 | 30 | 80 | 120 | 30 | 80 | 120 |
| Sample No.: | | | | | | | | |
| 1 | $4 \times 10^{15}$ | $1 \times 10^{13}$ | 3.4 | 3.5 | 3.7 | 0.2 | 0.3 | 1.3 |
| 10 | $8 \times 10^{14}$ | $2 \times 10^{13}$ | 3.3 | 3.4 | 3.5 | 0.3 | 0.3 | 0.7 |
| 11 | $2 \times 10^{14}$ | $3 \times 10^{11}$ | 2.7 | 3.0 | 4.0 | 0.3 | 1.8 | 3.2 |
| 12 | $2 \times 10^{15}$ | $6 \times 10^{12}$ | 3.5 | 3.6 | 3.7 | 0.2 | 0.4 | 1.5 |
| 8 | $4 \times 10^{15}$ | $1 \times 10^{13}$ | 3.5 | 3.6 | 3.8 | 1.3 | 0.9 | 2.3 |
| 13 | $4 \times 10^{15}$ | $4 \times 10^{14}$ | 3.3 | 3.3 | 3.4 | 0.4 | 0.3 | 0.9 |
| 14 | $4 \times 10^{14}$ | $5 \times 10^{11}$ | 2.8 | 3.5 | 4.0 | 0.3 | 6.2 | 4.0 |
| 15 | $7 \times 10^{14}$ | $3 \times 10^{11}$ | 3.7 | 3.9 | 4.8 | 0.2 | 0.8 | 10.0 |

The volume resistivity is a value measured after applying D.C. 100 v. for 1 minute, and the dielectric constant and dielectric loss tangent are values measured at the time when A.C. 1 kv. (60 Hz.) was applied.

TABLE 4

| Sample No. | Tensile strength (kg./cm.²) | Elongation (percent) | Modulus of elasticity (kg./cm.²) | Heat distortion temperature (° C.) |
| --- | --- | --- | --- | --- |
| 1 | 555 | 4.4 | $1.5 \times 10^4$ | 128 |
| 10 | 510 | 4.4 | $1.7 \times 10^4$ | 128 |
| 11 | 359 | 5.2 | $1.3 \times 10^4$ | 79 |
| 12 | 496 | 5.7 | $1.6 \times 10^4$ | 132 |
| 8 | 474 | 5.3 | $1.5 \times 10^4$ | 124 |
| 13 | 510 | 4.3 | $1.6 \times 10^4$ | 132 |
| 14 | 287 | 11.3 | $1.2 \times 10^4$ | 73 |
| 15 | 252 | 20.0 | $1.3 \times 10^4$ | 107 |

The mechanical properties of Sample Nos. 1, 10, 12, 8, 13 and 15 were measured at 100° C., and those of Sample Nos. 11 and 14 were measured at 50° C.

As is clear from Tables 3 and 4, the properties of cured products of the epoxy resin compositions prepared by using the aforesaid organoboron compounds as curing promotors are well comparable to, and rather somewhat excellent than, those in the case where known promotors are used.

EXAMPLE 5

A mixture comprising 100 parts by weight of Chissonox 221 (trade name for an alicyclic epoxy resin produced by Chisso K. K.) and 65 parts by weight of a MHC-P curing agent was blended with 1.0 part by weight of each of, as a curing promotor, TPP-K and tetraphenylarsonium tetraphenylborate to obtain desired epoxy resin compositions (Sample Nos. 16 and 17).

REFERENCE EXAMPLE 5

A mixture comprising 100 parts by weight of Chissonox 221 and 65 parts by weight of a MHAC-P curing agent was blended with 5 parts by weight of 2-ethyl-4-methylimidazole as a curing promotor to prepare an epoxy resin composition (Sample No. 18).

The gelation time, pot life and pot life-gelation time ratio of each of the epoxy resin compositions obtained in Example 5 and Reference Example 5 are set forth in Table 5.

TABLE 5

| Sample No. | Gelation time (hr.) at— | | Pot life (hr.) | Pot life/gelation time | |
| --- | --- | --- | --- | --- | --- |
| | 150° C. | 120° C. | | G 150° C. | G 120° C. |
| 16 | 0.30 | 1.20 | 370 | 1,233 | 318 |
| 17 | 0.25 | 1.50 | 425 | 1700 | 283 |
| 18 | 0.20 | 0.66 | 36 | 180 | 55 |

Epoxy resin compositions containing alicyclic epoxy resins are somewhat lower in both curability and pot life than those containing bisphenol type epoxy resins. As is clear from Table 5, however, it is understood that they have been greatly improved in said properties than the conventional epoxy resin composition.

The following examples show the cases where the present epoxy resin compositions were incorporated with filler powders and other additives.

EXAMPLE 6

Parts by weight
(a) Epikote 828 _____ 100
(b) MHAC-P _____ 85
(c) TPP-K _____ 5
(d) Globular quartz glass powder of 44 to 200μ in granularity (85% of which had a granularity of 74 to 150μ) (34% by volume) _____ 500
(e) Globular quartz glass powder of less than 100μ in granularity (90% of which had a granularity of less than 44μ) (41% by volume) _____ 600
(f) Calcium stearate (parting agent) _____ 5
(g) Carbon black (pigment) _____ 3

The above-mentioned components (a) to (g) were kneaded together for 1 hour by means of a mixing roll kept at 40 to 50° C. to obtain a desired epoxy resin composition.

When stored at room temperature, the thus obtained composition was stable for more than 6 months. This composition was transfer-molded under such conditions as a molding pressure of 30 kg./cm.², a temperature of 180° C. and a molding time of 3 minutes, and then after-cured at 150° C. for 24 hours, whereby a molded article could be obtained. The molded article (cured product) had such a low linear expansion coefficient of $8 \times 10^{-6}$/° C. (according to ASTM-D 696), which is substantially identical with that of alumina, and a thermal conductivity of $18 \times 10^{-4}$ cal./cm. sec. ° C. (according to ASTM-C 177).

EXAMPLE 7

Parts by weight
(a) ECN 1273 (trade name for an epoxy resin produced by Ciba Ltd.) _____ 100
(b) Tetrahydrophthalic anhydride curing agent __ 30
(c) Phthalic anhydride curing agent _____ 20
(d) Tetrabutylphosphonium tetraphenylborate ___ 3
(e) Globular alumina powder of 62 to 500μ in granularity (92% of which had a granularity of 150 to 500μ) (57% by volume) _____ 1500
(f) Globular alumina powder of less than 105μ in granularity (85% of which had a granularity of less than 44μ) (23% by volume) _____ 600
(g) Stearic acid (parting agent) _____ 2
(h) Zinc stearate (parting agent) _____ 2
(i) Carbon black _____ 5

The above-mentioned components (a) to (c) were first ground to such a size as to pass through a 100 mesh sieve and then kneaded with the components (d) to (i) at 50 to 60° C. for 40 minutes by means of a mixing roll. The resulting mixture was cooled and then coarsely ground so as to pass through a 6 mesh sieve to obtain a desired epoxy resin composition.

The thus obtained composition was stable at room temperature for more than 3 months, and could be molded at an ordinary molding temperature of 150° to 180° C. under such a low molding pressure of 20 to 100 kg./cm.². The time required for the molding was as short as 1 to 3 minutes. The composition was molded under such molding conditions as a temperature of 180° C., a pressure of 50 kg./cm.² and a time of 1 minute to obtain a molded article having a linear expansion coefficient of $10 \times 10^{-6}$/° C. and a thermal conductivity of $180 \times 10^{-4}$ cal./cm. sec. ° C.

EXAMPLE 8

Parts by weight
(a) DER 332 _____ 100
(b) MHAC-P _____ 80
(c) TPP-K _____ 5
(d) Globular non-crystalline silica powder of 44 to 200μ in granularity (85% of which had a granularity of 105 to 200μ) (52% by volume) _____ 700
(e) Globular non-crystalline silica powder of less than 150μ in granularity (90% of which had a granularity of less than 44μ (22% by volume) __ 300
(f) Lead dioxide powder of less than 40μ in granularity (1.8% by volume) _____ 100
(g) Carbon black _____ 2

The above-mentioned components (a) to (g) were kneaded together for 30 minutes by means of a mixing roll kept at 40° C. to obtain a desired epoxy resin composition.

The thus obtained composition was stable at room temperature for more than 6 months. Further, the composition could be easily transfer-molded under such conditions as a temperature of 170° C., a pressure of 10 to 50 kg./cm.² and a time of 3 minutes. The molded article, after being subjected to after-curing at 150° C. for 16 hours, had a linear expansion coefficient of $1.0 \times 10^{-5}$/° C., which is identical with that of iron or ceramic. Further, the volume resistivity of the molded article after being immersed in boiling water for 100 hours, was $3 \times 10^{14}$ Ωcm.

EXAMPLE 9

| | Parts by weight |
|---|---|
| (a) Epikote 1031 (trade name for an epoxy resin produced by Shell Chemical Co.) | 100 |
| (b) Tetrahydrophthalic anhydride | 60 |
| (c) TPP–K | 2 |
| (d) Globular zirconium silicate powder of 44 to 500μ in granularity (80% of which had a granularity of 105 to 500μ) (53% by volume) | 1400 |
| (e) Globular zirconium silicate powder of less than 105μ (85% of which had a granularity of less than 44μ) (22% by volume) | 600 |
| (f) Carnauba wax (parting agent) | 2.5 |
| (g) Zinc stearate | 2.5 |
| (h) Carbon black | 5 |

The above-mentioned components (a) and (b) were first ground to such a size as to pass through a 100 mesh sieve and then kneaded with the components (c) to (h) at 60° to 70° C. for 30 minutes by means of a mixing roll. The resulting mixture was cooled and then coarsely ground so as to pass through a 6 mesh sieve to obtain a desired epoxy resin composition.

The thus obtained composition was stable at room temperature for more than 3 months, and could be easily transfer-molded under such conditions as a temperature of 150 to 180° C., a pressure of 5 to 100 kg./cm.² and a time of 1 to 3 minutes. When molded under such conditions as 180° C., 50 kg./cm.² and 1 minute, the composition gave a molded article having a linear expansion coefficient of $1.0 \times 10^{-5}$/° C. and a thermal conductivity of $30 \times 10^{-4}$ cal./cm. sec.° C.

EXAMPLE 10

| | Parts by weight |
|---|---|
| (a) Epikote 828 | 80 |
| (b) Epikote 1001 (trade name for an epoxy resin produced by Shell Chemical Co.) | 20 |
| (c) Trimellitic anhydride | 40 |
| (d) TPP–K | 1 |
| (e) Quartz glass powder of 62 to 200μ in granularity (91% of which had a granularity of 74 to 200μ) (30% by volume) | 200 |
| (f) Alumina powder of less than 74μ in granularity (94% of which had a granularity of less than 44μ) (26% by volume) | 310 |
| (g) Glass short fiber of about 10μ in diameter and 10 to 400μ in length (5% by volume) | 32 |
| (h) Zinc stearate | 4 |
| (i) Carbon black | 4 |

The above-mentioned components (a) to (c) were first ground individually to such a size as to pass through a 100 mesh sieve, and then kneaded with the components (d) to (f), (h) and (i) at 60° to 70° C. for 20 minutes by means of a mixing roll. The resulting mixture was further kneaded with the component (g) for additional 5 minutes, and then cooled and coarsely ground to obtain a desired epoxy resin composition.

The thus obtained composition was substantially identical with the composition of Example 6 in storage stability at room temperature, curability and moldability. When molded under such conditions as 170° C., 50 kg./cm.² and 3 minutes, the composition gave a molded article having a linear expansion coefficient of $15 \times 10^{-6}$/° C. and a thermal conductivity of $20 \times 10^{-4}$ cal./cm. sec. ° C.

What we claim is:

1. An epoxy resin composition which comprises an epoxy resin, an acid anhydride curing agent and a curing promotor composed of an organoboron compound represented by the general formula,

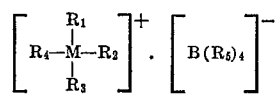

wherein M represents P or As; and $R_1$, $R_2$, $R_3$, $R_4$ and $R_5$, which may be same or different, represent individually an alkyl, alkenyl or aryl group.

2. An epoxy resin composition according to claim 1, wherein the epoxy resin is an epoxy resin having a 1,2-epoxy group.

3. An epoxy resin composition according to claim 1, wherein the curing promotor composed of an organoboron compound is an organoboron compound represented by the general formula,

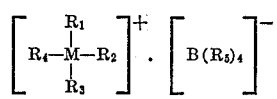

wherein M represents P; and $R_1$, $R_2$, $R_3$, $R_4$ and $R_5$, which may be same or different, represent individually an alkyl, alkenyl or aryl group.

4. An epoxy resin composition according to claim 1, wherein the curing promotor composed of an organoboron compound is an organoboron compound represented by the general formula,

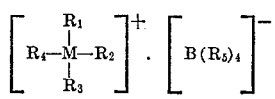

wherein M represents P or As; and $R_1$, $R_2$, $R_3$, $R_4$ and $R_5$ represent a phenyl group.

5. An epoxy resin composition according to claim 1, wherein the composition is blended with 5 to 60% by volume of a filler powder having a fine granularity of less than 44μ and 10 to 70% by volume of a filler powder having a coarse granularity of more than 74μ.

6. An epoxy resin composition according to claim 1, wherein the organoboron compound is at least one member selected from the group consisting of tetrabutylphosphonium tetraphenylborate, (n-butyl)triphenylphosphonium tetraphenylborate, tetraphenylphosphonium tetraphenylborate, trimethylphenylphosphonium tetraphenylborate, diethylmethylphenylphosphonium tetraphenylborate, diallylmethylphenylphosphonium tetraphenylborate, (2-hydroxyethyl)triphenylphosphonium tetraphenylborate, (ethyl)triphenylphosphonium tetraphenylborate, p-xylenebis(triphenylphosphonium tetraphenylborate), tetraphenylphosphonium tetraethylborate, tetraphenylphosphonium triethylphenylborate, tetraphenylphosphonium tetrabutylborate and tetraphenylarsonium tetraphenylborate.

7. An epoxy resin composition according to claim 1, wherein the amount of the organoboron compound is 0.1 to 10 parts by weight per 100 parts by weight of the epoxy resin.

8. An epoxy resin composition according to claim 1, wherein the acid anhydride curing agent is at least one member selected from the group consisting of maleic, dichloromaleic, dodecenylsuccinic, pyromellitic, trimellitic, phthalic, tetrahydrophthalic, hexahydrophthalic, endomethylenetetrahydrophthalic, methylendomethylenetetrahydrophthalic and hexachloroendomethylenetetrahydrophthalic anhydrides, methyltetrahydrophthalic anhydride and methylhexahydrophthalic anhydride.

9. An epoxy resin composition according to claim 1, wherein the amount of the acid anhydride curing agent is 0.001 to 1.5 moles per mole epoxy equivalent of the epoxy resin.

10. An epoxy resin composition according to claim 5, wherein the filler powder is at least one member selected from the group consisting of powders of alumina, silica, magnesia, zirconia, calcium oxide, zirconium silicate, calcium silicate, beryllium aluminum silicate, lithium aluminum silicate, magnesium silicate, aluminum silicate, ilmenite, barium sulfate, calcium sulfate, calcium carbonate, barium carbonate, lead oxide (PbO), lead dioxide ($PbO_2$), red lead ($Pb_3O_4$) and lead sesquioxide ($Pb_2O_3$).

References Cited

UNITED STATES PATENTS

| 3,271,476 | 9/1966 | Widmer et al. | 260—47 EA X |
| 3,394,105 | 7/1968 | Christie | 260—47 EA |
| 3,400,098 | 9/1968 | Parry | 260—47 EA X |

MORRIS LIEBMAN, Primary Examiner

L. T. JACOBS, Assistant Examiner

U.S. Cl. X.R.

260—47 EA